United States Patent
Chavez, Jr.

(10) Patent No.: US 12,268,950 B1
(45) Date of Patent: Apr. 8, 2025

(54) AIR PROPULSION SYSTEM FOR SNOW EQUIPMENT

(71) Applicant: Jose Cruz Chavez, Jr., Bend, OR (US)

(72) Inventor: Jose Cruz Chavez, Jr., Bend, OR (US)

( * ) Notice: Subject to any disclaimer, the term of this patent is extended or adjusted under 35 U.S.C. 154(b) by 0 days.

(21) Appl. No.: 18/809,129

(22) Filed: Aug. 19, 2024

Related U.S. Application Data

(60) Provisional application No. 63/533,383, filed on Aug. 18, 2023.

(51) Int. Cl.
| | | |
|---|---|---|
| A63C 5/08 | (2006.01) | |
| A63C 5/03 | (2006.01) | |
| A63C 5/06 | (2006.01) | |
| B62M 27/02 | (2006.01) | |
| F04D 25/06 | (2006.01) | |
| F04D 27/00 | (2006.01) | |
| H01M 10/625 | (2014.01) | |

(52) U.S. Cl.
CPC .............. *A63C 5/08* (2013.01); *A63C 5/03* (2013.01); *A63C 5/06* (2013.01); *B62M 27/02* (2013.01); *F04D 25/0673* (2013.01); *F04D 27/004* (2013.01); *A63C 5/031* (2013.01); *H01M 10/625* (2015.04)

(58) Field of Classification Search
CPC . A63C 5/03; A63C 5/031; A63C 5/08; B62M 2027/023
See application file for complete search history.

(56) References Cited

U.S. PATENT DOCUMENTS

| | | | | |
|---|---|---|---|---|
| 1,146,210 | A * | 7/1915 | Steen | A63C 17/18 280/7.14 |
| 1,792,031 | A * | 2/1931 | Price | B63B 1/38 440/37 |
| 2,456,440 | A * | 12/1948 | Morrill | B62M 27/00 280/809 |
| 2,700,427 | A * | 1/1955 | Schomers | B62M 27/02 244/108 |
| 2,905,479 | A * | 9/1959 | Schomers | B62M 27/00 180/7.4 |
| 3,136,288 | A * | 6/1964 | Hardy | B63B 34/10 440/63 |
| 3,576,376 | A * | 4/1971 | Steeg | B62M 27/00 416/247 R |
| 3,750,777 | A * | 8/1973 | Thompson | B62M 27/02 180/10 |
| 3,814,197 | A * | 6/1974 | Milankov | B62D 57/04 180/182 |
| 3,861,492 | A * | 1/1975 | Jensen, Sr. | B62M 27/02 280/7.14 |

(Continued)

*Primary Examiner* — Jeffrey J Restifo
(74) *Attorney, Agent, or Firm* — Plager Schack LLP; Mark H. Plager, Esq.; Naomi Mann, Esq.

(57) ABSTRACT

An air propulsion system for propelling snow equipment such as snowboards, skis, snow bikes, and the like comprises at least one electric ducted fan motor, and a self-contained power source, such as a battery pack configured to power the fan motor. In certain embodiments, the fan motor(s) and battery pack are mounted in a manner which avoids unwanted interference with the operation of the equipment. In further embodiments, the system may include a signal receiver and a signal transmitter configured to enable user control of the system. In some further embodiments, the system may optionally comprise a rotation gear and/or servo motor(s).

16 Claims, 3 Drawing Sheets

(56) References Cited

U.S. PATENT DOCUMENTS

| | | | | |
|---|---|---|---|---|
| 4,096,919 A * | 6/1978 | Thompson | B62D 51/001 | |
| | | | 123/185.2 | |
| 4,189,019 A * | 2/1980 | Zech | B63H 7/02 | |
| | | | 180/7.4 | |
| 4,260,036 A * | 4/1981 | Bissett | B62B 13/10 | |
| | | | 180/7.3 | |
| 4,407,215 A * | 10/1983 | Cyr | B63C 13/00 | |
| | | | 440/37 | |
| 4,984,648 A * | 1/1991 | Strzok | A63C 5/08 | |
| | | | 180/181 | |
| 5,025,745 A * | 6/1991 | Wine | B63H 21/32 | |
| | | | 440/89 C | |
| 5,222,569 A * | 6/1993 | Martel | A63C 5/08 | |
| | | | 180/7.4 | |
| 5,503,242 A * | 4/1996 | Jeffers | B62M 27/02 | |
| | | | 280/22.1 | |
| D427,562 S * | 7/2000 | Phelan | D12/300 | |
| 7,179,141 B1 * | 2/2007 | McMullen | B63H 7/02 | |
| | | | 440/37 | |
| 7,331,833 B2 * | 2/2008 | Burgess, Jr. | A63C 17/267 | |
| | | | 440/37 | |
| 7,686,109 B2 * | 3/2010 | Brazier | B62M 27/02 | |
| | | | 305/169 | |
| 7,690,958 B2 * | 4/2010 | Burgess, Jr. | B63H 7/02 | |
| | | | 440/37 | |
| 7,784,571 B2 * | 8/2010 | Brazier | A63C 5/08 | |
| | | | 305/44 | |
| 7,789,034 B1 * | 9/2010 | Simpson, Sr. | B63B 17/0081 | |
| | | | 440/37 | |
| 7,900,723 B2 * | 3/2011 | Brazier | A63C 5/03 | |
| | | | 305/44 | |
| 8,292,678 B2 * | 10/2012 | Burgess, Jr. | B62M 23/02 | |
| | | | 440/37 | |
| 9,114,695 B2 * | 8/2015 | Burgess, Jr. | B60K 8/00 | |
| 2023/0356839 A1 * | 11/2023 | Bitar | B64C 31/024 | |

* cited by examiner

AIR PROPULSION SYSTEM FOR SNOW EQUIPMENT

RELATED APPLICATION

This application claims benefit to U.S. Provisional Application No. 63/533,383, filed Aug. 18, 2023, which is incorporated by reference herein in its entirety.

BACKGROUND

The present disclosure relates generally to systems for propulsion of snow equipment, and snow equipment including but not limited to snowboards, skis, and snow bikes, and to snow equipment incorporating propulsion systems.

Snow equipment users, such as snowboarders, may typically need to unstrap and push themselves with one leg when losing momentum and/or traversing uphill. Some propulsion systems for snow equipment, such as tracked and/or wheeled propulsion devices may need to be lowered into the snow to provide propulsion or be permanently engaged in the snow. This may impede ability to turn, and/or increase friction when not in use. As such, an improved system for propulsion of snow equipment is desirable.

SUMMARY

According to various embodiments, disclosed is a system for propelling snow equipment through snow, comprising: at least one electric ducted fan motor mounted to the snow equipment, and configured to provide thrust for propelling the snow equipment without direct contact between the electric ducted fan motor and the snow; a controller unit mounted to the snow equipment, the controller unit configured to communicate with the electric ducted fan motor and comprising a power source configured to power the electric ducted fan motor; wherein the controller unit and electric ducted fan motor are mounted to the snow equipment in a manner which avoids unwanted interference with the operation of the equipment. In some embodiments, the power source comprises a battery. In some embodiments, the system for propelling snow equipment further comprises user control system. In certain embodiments, the user control system is configured to allow a user to control speed and/or the amount of thrust provide by the electric ducted fan motor. In some embodiments, the user control system is configured to allow a user to steer the snow equipment in different directions. In some embodiments, the user control system comprises a wireless device that can be held by a user of the snow equipment to control speed, direction, and/or turn the electric ducted fan motor off and on. In certain embodiments, the ducted fan motor includes a removable safety cover comprising a mesh screen. In some embodiments, the ducted fan motor is mounted proximate a trailing and/or leading edge of the snow equipment.

In some embodiments, the ducted fan motor is mounted via a mounting element which elevates the ducted fan motor above a top surface of the snow equipment. In certain embodiments, the power source comprises a battery pack, which includes a battery, and a battery heating element. In some embodiments the power source further comprise at least one battery insulation component. In some embodiments, the system further comprises a safety shutoff cord including a first end configured to connect to the controller unit, and to be pulled out of the controller unit for shutting off power to the electric ducted fan motor. In some embodiments, the safety shutoff cord includes a user attachment element on a second end opposite the first end. In certain embodiments, the user attachment element may be a cuff, loop, or other attachment element which may be attached or worn around the user's wrist, ankle, leg, belt loop, clothing, worn accessory, and the like. In some embodiments, the system further comprises wiring for electrical communication between the controller unit and electric ducted fan motor. In some embodiments, the snow equipment comprises a snowboard. In some embodiments, the controller unit is mounted between a pair of bindings of the snowboard. In certain embodiments, the snow equipment comprises skies or a snow bike.

BRIEF DESCRIPTION OF THE FIGURES

The detailed description of some embodiments of the invention will be made below with reference to the accompanying figures, wherein the figures disclose one or more embodiments of the present invention.

DETAILED DESCRIPTION OF CERTAIN EMBODIMENTS

Figure 1:
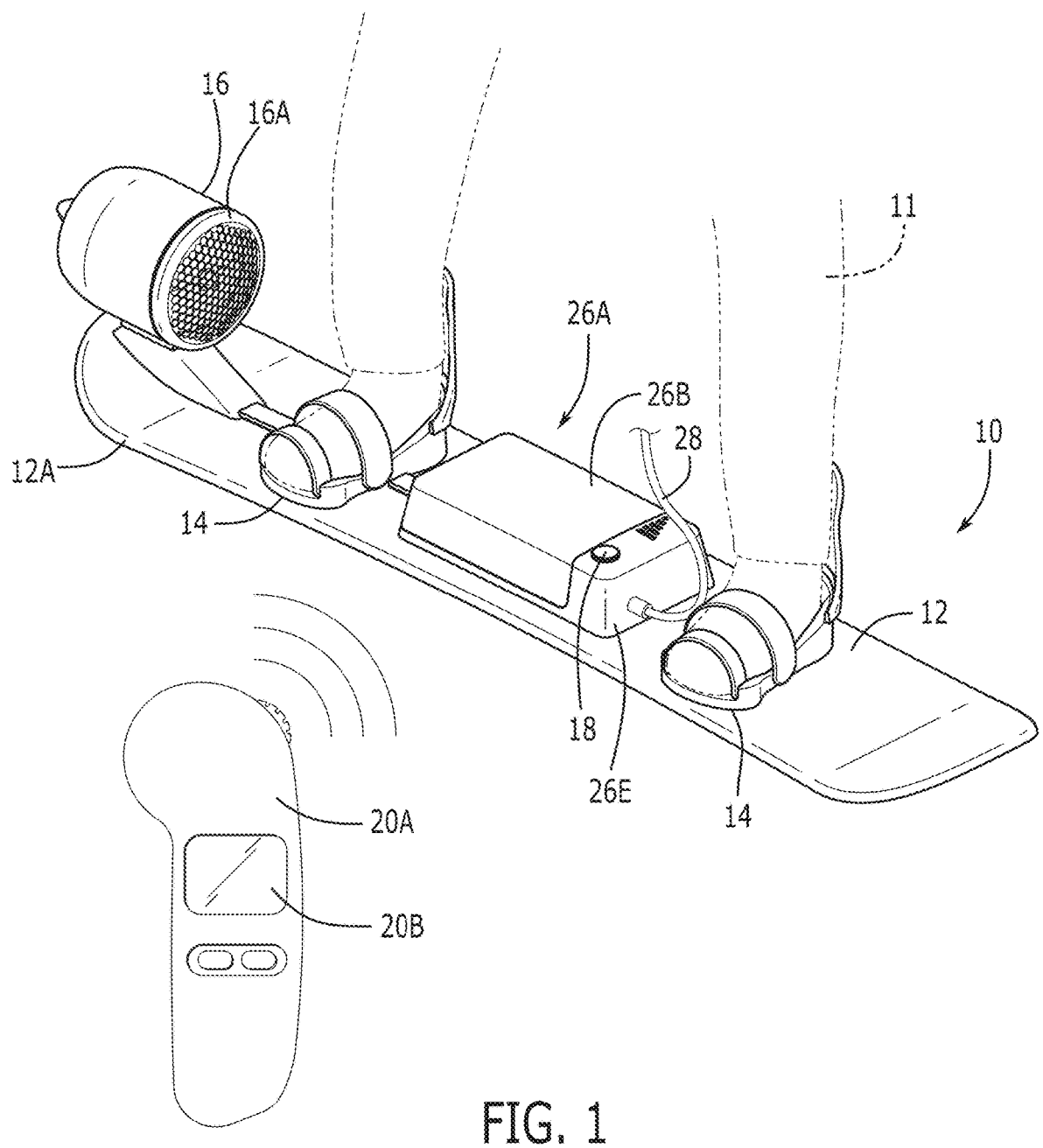
FIG. 1 is a top perspective view of a snowboard including an air propulsion system, according to certain embodiments.
Figure 2:
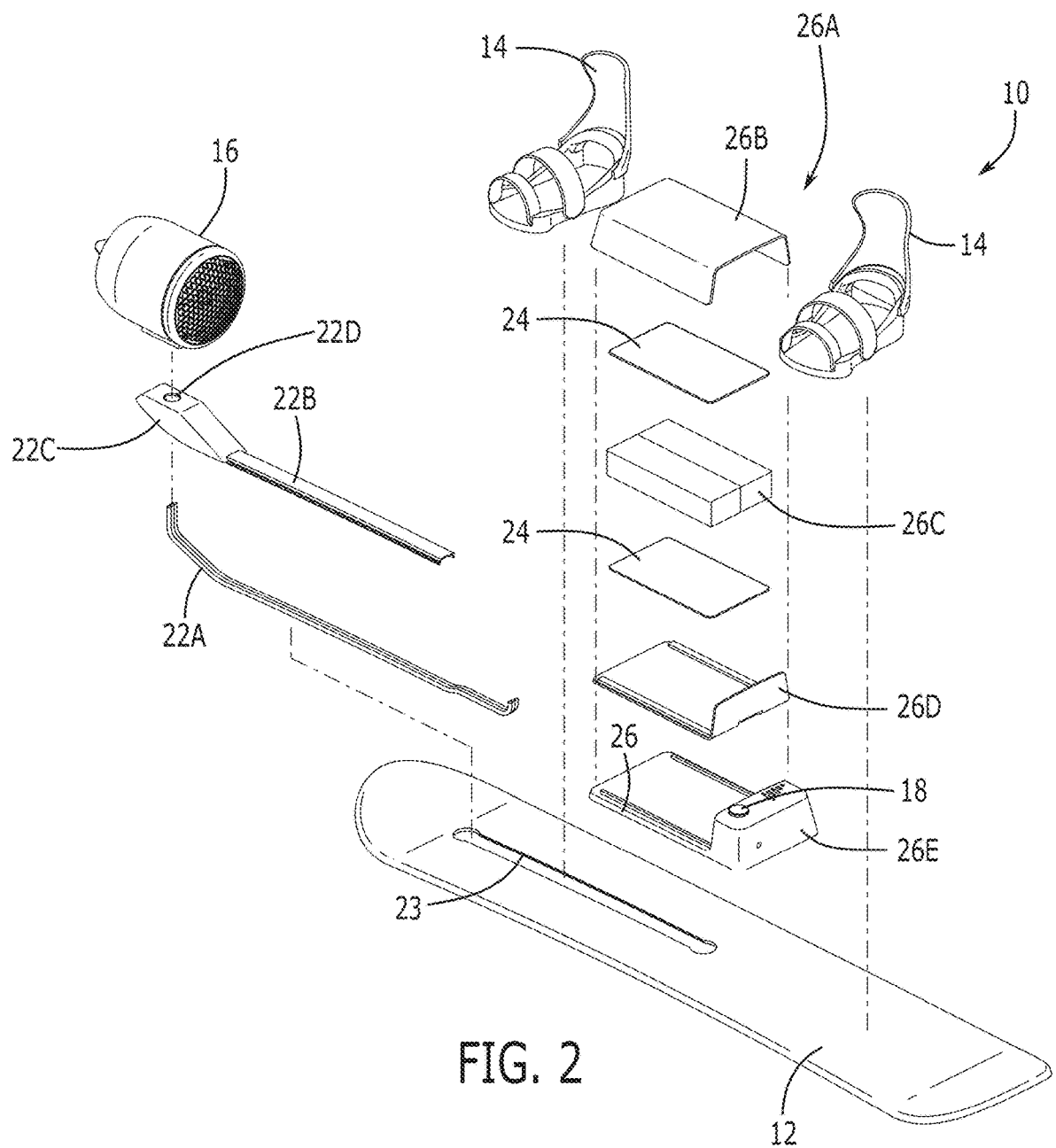
FIG. 2 is an exploded perspective view of the components of the air propulsion system of FIG. 1.
Figure 3:
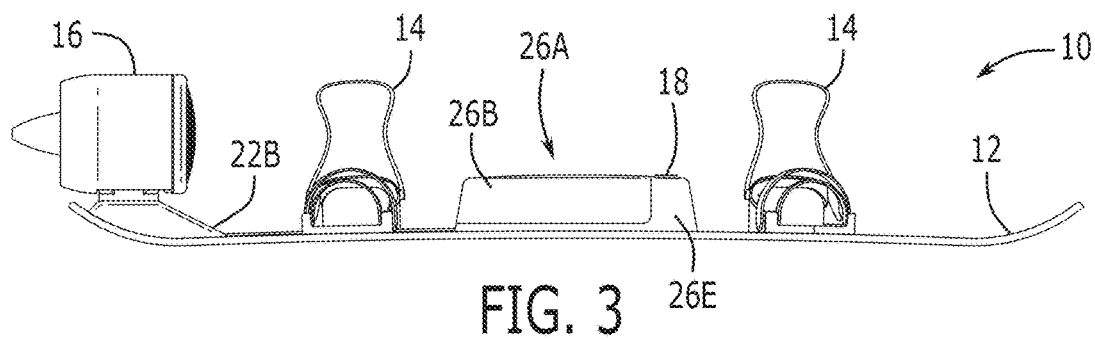
FIG. 3 is a front elevation view of snowboard with air propulsion system of FIG. 1.
Figure 4:
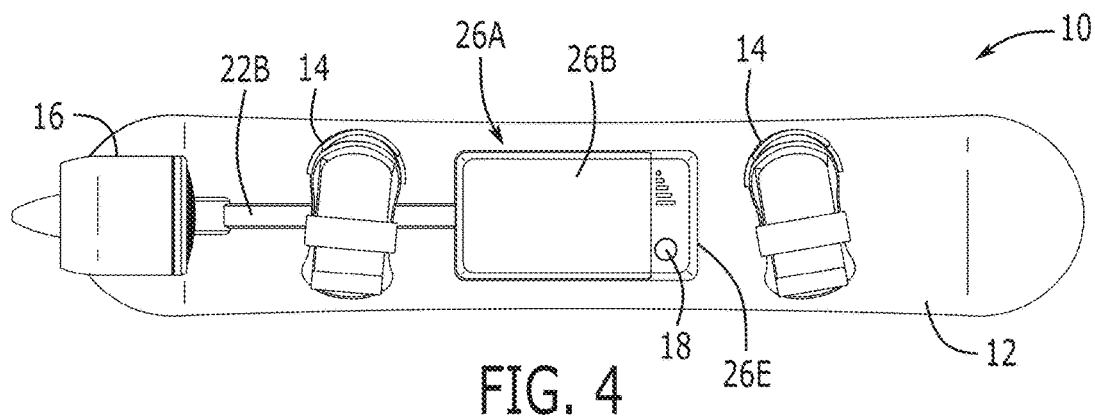
FIG. 4 is a top plan view thereof.
Figure 5:
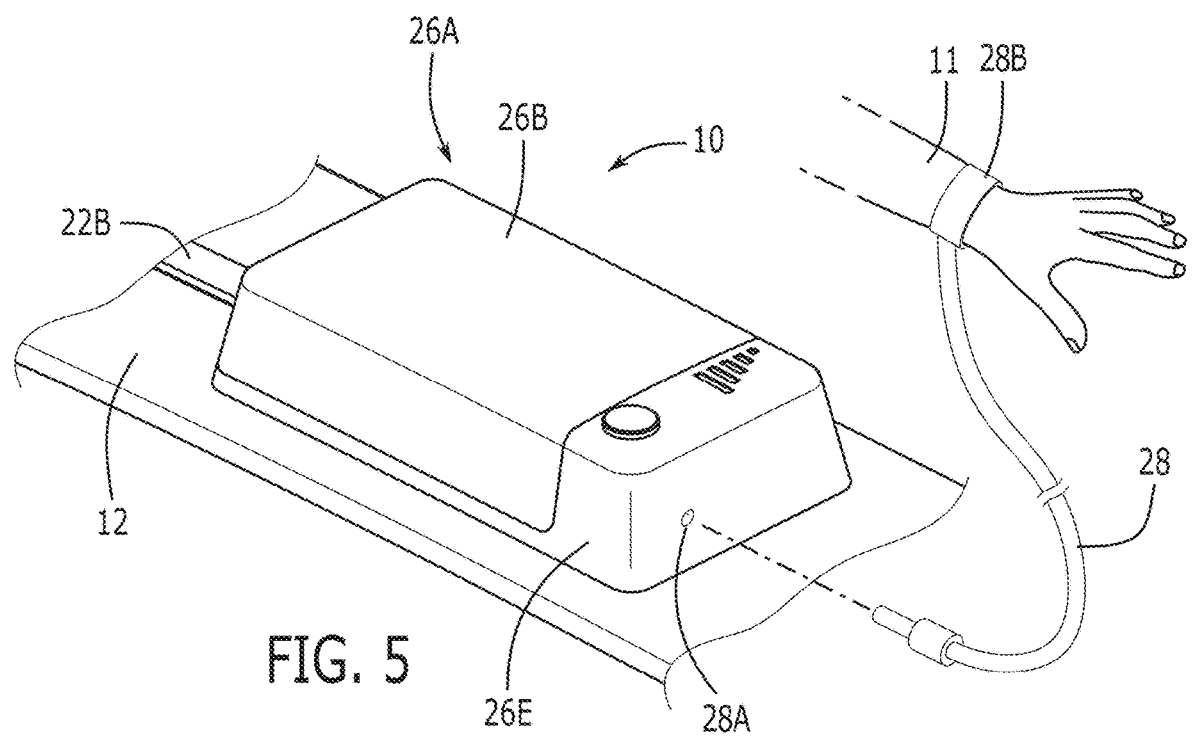
FIG. 5 is a perspective view of a controller unit of the air propulsion system, illustrating disconnection of a safety lanyard of the system.

According to various embodiments as depicted in FIGS. 1-5 disclosed is an air propulsion system 10 for propelling snow equipment 12 such as a snowboard 12A (as shown in the figures), and/or other snow equipment such as skis, snow bikes, and the like. In embodiments, air propulsion system 10 comprises at least one electric ducted fan motor 16, which avoids direct contact with the snow and can be implemented without complex and/or obtrusive mechanisms. In certain embodiments, air propulsion system 10 is configured to allow a user 11 to control fan motor speed. In some further embodiments, air propulsion system 10 may be steerable, and may allow for steering in the pitch and yaw axis for added mobility control. In some further embodiments, air propulsion system 10 may be configured to receive control signals via wireless controller 20A and/or other electronic device that may be operated by user 11.

In certain embodiments, ducted fan motor 16 may be a speed-controlled motor that creates a corresponding amount of thrust to the input current for propelling snow equipment 12/12A. In some embodiments, ducted fan motor 16 may optionally include a safety cover 16A for preventing damage to the blades from ice or other hard debris, and accidental finger injury. In certain embodiments, safety cover 16A may be a mesh screen configured to releasably attach to the front of ducted fan motor 16, for example via a threaded connection, clips, a friction fit, or other retaining element. In certain embodiments, ducted fan motor 16 may be powered and/or controlled by a power and/or controller unit 26A which include a battery pack and various system control elements.

In certain embodiments, ducted fan motor 16 and controller unit 26A are mounted to snow equipment 12 in a manner which avoids unwanted interference with the operation of the equipment. In certain embodiments, ducted fan motor 16 may be mounted around a back/trailing edge of the top surface of snowboard 12A via a mounting element 22C for optimizing propulsion efficiency and avoiding interference with bindings 14 of the snowboard. In certain embodiments, mounting element 22C may elevate fan motor 16 about 1 cm to about 20 cm above the top surface of the snowboard to decrease the likelihood of snow entering the motor. It shall be appreciated that in alternate embodiments, fan motor 16 may be mounted at different elevations and positions. Additionally, fan motor 16 may be mounted at the leading edge of the snowboard in alternate embodiments, however this may create drag due to interference with the user's leg. It shall further be appreciated that in alternate embodiments, more than one fan motor may be used, e.g., one at the leading edge and one at the trailing edge.

In certain embodiments, controller unit 26A may be mounted to the top surface of snowboard 12A and between bindings 14 via a support base 26 of the unit. This central mounting position may increase the center of gravity of the snowboard system and avoids interference with the binding. However, in alternate embodiments, controller unit 26A may be mounted at other locations, e.g., behind the rear binding or in front of the front binding (which may balance out the weight of fan motor 16 at the rear edge); in other embodiments, controller unit 26A may be self-contained within fan motor 16.

In some embodiments, controller unit 26A may house a battery pack including a battery 26C and other optional components such as insulation components 24 and a battery heating element 26D. in embodiments, insulation components 24 may help keep the battery warm for optimal current discharge performance. Heating element 26D may be powered for heating controller unit 26A/battery 26C in cold weather conditions when necessary. In some embodiments, heating element 26D may be regulated via controller unit 26A to maintain an optimal temperature for the battery chemistry to perform in cold weather. In certain embodiments, battery pack components may be encased between support base 26 and a battery shell cover 26B as shown. In some further embodiments, controller unit 26A may include controller elements 26E that may be housed within support base 26. In certain embodiments, controller elements 26E may comprise a wireless signal receiver which is configured to receive a wireless signal from wireless controller 20A, a PCB which may be configured to control fan motor 16 and manage battery charging, battery temperature regulation, and various other electronic, control, and/or communication components for operating air propulsion system 10. In some embodiments, a system status screen which may display battery health, and radio frequency connection status, etc., may be provided within controller unit 26A.

In some embodiments, support base 26 may further include a power button 18 for turning the system on or off manually, and optionally other manual control elements. In some further embodiments, a safety shutoff cord or lanyard 28 may be coupled between support base 26 and user 11, and is configured to shut off air propulsion system 10 when disconnected. In one embodiment, one end of safety shutoff lanyard 28 may be connected to a port 28A in support base, and the other end may include a user attachment element 28B such as a cuff, loop, clip, etc. which may be attached to or worn around the user's wrist, ankle, leg, belt loop, clothing, and/or clothing accessory, etc. As such, if user 11 falls off or otherwise becomes separated from snow equipment 12, air propulsion system 10 is switched off to stop propelling.

In certain embodiments, controller unit 26A may be coupled to fan motor 16 via a motor control harness/wiring 22A which runs between support base 26 and fan motor 16 and is configured to send current from controller unit 26A to electric ducted fan motor 16. In one embodiment, wiring 22A may be contained within a housing cover 22B installed along the surface of snowboard 12A. Housing cover 22B may provide an elongated track incorporating mounting element 22C for supporting fan motor 16. Mounting element 22C may comprise an elevated platform and may further include a hole 22D for wire passage. It shall be appreciated however, that mounting element 22C may have different configurations in alternate embodiments. In some embodiments, an elongated slot 23 may be provided within snowboard 12A for receiving wring 22A and housing cover 22B. Wiring 22A is thus contained within housing cover 22B and protected from impact and displacement. In one embodiment, housing cover 22B may be substantially leveled with the surface of snowboard 12A, but not necessarily so.

As such, controller unit 26A including battery 26C and battery pack components may be mounted directly on snow equipment 12, i.e., snow board 12A. Battery 26C is configured to supply power to fan motor 16 and/or to a motor speed controller of fan motor 16. In certain embodiments, the battery pack components, i.e., battery 26C, insulation components 24, and battery heating element 26D are securely retained between support base 26 and battery shell cover 26B. In one embodiment, the battery pack and/or controller unit 26A may be removable from the snow equipment. In other embodiments, the battery pack and/or controller unit 26A may be non-removable. In certain embodiments, the battery pack and/or controller unit 26A may be located between the two bindings 14, as shown in the figures to maintain a strong center of gravity, but not necessarily so. In some further embodiments, system 10 may include a battery charger for charging battery 26C, particularly where the battery pack and/or controller unit 26A is permanently mounted. In embodiments, the battery charger may be a regulated power supply for supplying the correct voltage and current to recharge the battery pack. In embodiments where the battery pack and/or controller unit 26A is removable, battery 26C may be charged off the equipment, and/or replaced with a fully charged pack and/or battery when the battery charge has been depleted. It shall be appreciated that battery 26C can be made of several battery types and chemistries, including but not limited to lithium ion, lithium phosphate, nickel metal hydride or others. Additionally, the battery voltage can vary depending on the configuration and power output desired. In certain embodiments, the battery pack cover 26B may be textured to provide a snowboarder better grip/friction so that the snowboarder may place his/her foot on the battery pack. In certain embodiments, battery heating element 26D may be provided to help with battery performance in cold weather. It shall be appreciated that controller unit 26A may include different components in alternate embodiment. Such components may include, for example, a battery cut-off that prevents operation when over-charged, under-charged, overheated or overcooled; a heat dissipating element; a battery display configured to indicate remaining voltage, etc. Additionally, the battery components may be separate from controller elements 26E in alternate embodiments and may be mounted at different locations with a harness connection.

In certain embodiments, wireless controller 20A may be configured to remotely communicate a speed command to the signal receiver, whereby the signal receiver is configured to send a power output signal to a motor speed controller in ducted fan motor 16. This outputs the appropriate current to drive the electric ducted fan motor for providing the needed propulsion to propel snow equipment 12. In certain embodiments, wireless controller 20A may be a dedicated device for controlling air propulsion system 10. In alternate embodiments, wireless controller 20A may comprise a user's smart electronic device (e.g., table, iPhone, etc.), running an app for control of air propulsion system 10. Wireless controller 20A may comprise, for example, an interface screen 20B configured to receive user input and display system status (e.g., battery health, and radio frequency connection status, etc.). Wireless controller 20A may use, for example, Bluetooth, radio frequency (RF), near field communication (NFC), Infrared signal (IR) or other forms of wireless signals to communicate with the wireless signal receiver in controller unit 26A.

In certain embodiments, ducted fan motor 16 may a speed-controlled fan motor which incorporates a motor speed controller. The motor speed controller may be an electronic device configured to output a current for driving the electric ducted fan motor. In certain embodiments, the motor speed controller is configured to provide an amount of thrust to the input current corresponding to user commands, wherein the thrust is used to propel snow equipment 12 (i.e., snowboard, skis, or snow bike, etc.). The ducted fan design eliminates the hazard of a standard open-air propeller. In certain embodiments, fan intake safety cover 16A reduces the risk of harm to the user and damage to electric ducted fan motor. In further embodiments, ducted fan motor 16 may include a solid cover for preventing snow from getting in the motor when not in use. Such cover may be placed over safety cover 16A or over the opening of ducted fan motor 16 when safety cover 16A is omitted. It shall be appreciated that any number of fan motors may be used in alternate embodiments, depending on the type of snow equipment, and factors such as user/design preferences, economics, operational needs, etc.

In some embodiments, air propulsion system 10 may optionally include a rotation gear and/or servo motor(s), wherein wireless controller 20A may also be used to send pitch and yaw commands to the signal receiver for commanding the servo motor to rotate the rotation gear to the desired orientation, allowing the user to control heading. Thus, the signal receiver may receive thrust, yaw, and/or pitch command from wireless controller 20A. In certain embodiments, the rotation gear may comprise a series of gears at the base of the motor that are used to control the rotation of the motor when commanded. The servo motor may be configured to rotate the rotation gears according to the commanded orientation.

To operate system 10, user 11 may turn on the power button controller unit 26A, then turn on wireless controller 20A to establish a connection with the controller unit. The user may then attach safety shutoff lanyard 28 to him/herself and insert the other end into the controller unit port. The user can then give a throttle command via wireless controller 20A, which will be received by controller unit 26A to output a corresponding amount of current from the battery, via wiring to electric ducted fan motor 16, creating thrust to propel the user and snowboard forward. It shall be appreciated that communication between user 11, controller unit 26A, and ducted fan motor 16 may be wired and/or wireless in alternate embodiments. For example, in some embodiments, controller unit 26A may include command buttons on the unit for transmitting commands directly to ducted fan motor 16 without wireless controller 20A. In other embodiments, a hand held controller, similar to controller 20A may be wired to controller unit 26A. In some other embodiments, communication between controller unit 26A and ducted fan motor 16 may be wireless, e.g., via Bluetooth, radio frequency (RF), near field communication (NFC), Infrared signal (IR) or other forms of wireless signals.

In embodiments, the disclosed system may be implemented by mounting one or more electric ducted fan motor(s) to the rear of snowboard 12A, or other snow equipment such as skis, or snow bike, via mounting element 22C. In some further embodiments, the motor mount (i.e., mounting platform 22C) can optionally comprise gears and servos to control electric ducted fan motor 16 on the pitch and yaw axis and give the user more agile control of the thrust direction. The battery positive and ground terminals may be connected to the motor speed controller. Wiring 22A may further be connected from the signal receiver to the motor speed controller and to the pitch and yaw servos if applicable. The current output wires may then be connected from the motor speed controller(s) to the electric ducted fan motor(s). In certain embodiments, the wiring may be routed around and/or underneath the bindings. In some embodiments, a housing may be provided for containing the system wiring components. In other embodiments, the wiring may be routed in the body of the board and/or below the top surface of the board, so that it is not externally visible. It shall be appreciated that the mounting positions of the system components may vary in alternate embodiments. Additionally, the system components may be permanently attached or removable in alternate embodiments.

In certain embodiments, a safety switch may be in line with a power circuit from the battery to the electronic speed controller/s, then motors. When installed/inserted it allows current to flow from the battery/ies to the electronic speed controller/s (inserted=On, removed=Off). When removed, it opens the circuit and cuts off power. In embodiments, the safety switch may be a pin switch coupled to lanyard 28. In case the rider becomes separated from the snowboard (snow equipment) the lanyard will pull the pin out of the circuitry, cutting power to the electronic speed controller/s, in-turn shutting the motors off. It will also act as an emergency shutoff switch in the event a button on the transmitter gets stuck while commanding thrust to the motors. This will allow the user to shut the motors off without needing to correct the malfunctioning transmitter.

As such, the disclosed subject matter provides a system which uses battery powered ducted fan motors to create air propulsion so that the user may move forward without needing to unstrap. Additionally, the battery powered ducted fan motors provide a system which is positioned placed out of the way and out of the snow and can be turned on and off as required. It shall be appreciated that the disclosed system may incorporate single or multiple motors depending on the amount of thrust required or desired.

EXAMPLE

Given a coefficient of friction of 0.20, the force required to propel a snowboarder/snowboard system weighing about 150 lbs. (667.233N) on a flat surface and using electric ducted fan (EDF) motor(s) (of the disclosed system, may be calculated as follows:

Force=coefficient of friction*Normal force=0.2*667.233 N≈133.45 N

Therefore, approximately 133.45 Newtons of force would be required to move a 150 lb. snowboarder on a flat snow surface with a coefficient of friction of 0.2. In certain embodiments, a single EDF motor may be sufficient for producing this force; however, for heavier riders, and/or for use on upward inclines, dual or multiple motors may be required depending on the motor strength.

It shall be appreciated that the disclosed device and system can have multiple configurations in different embodiments. For example, in alternate embodiments, the disclosed system may be combined with additional propulsion elements known in the art, such as a motorized and textured wheel to create propulsion by rotating against the snow. It shall be appreciated that components of snow propulsion system 10 may be used for propelling other vehicles, including but not limited to water vehicles such as kayaks, stand up paddle boards, and surf boards; and land devices such as bicycles, go carts and skateboards in alternate embodiments. It shall be appreciated that the mounting location of the electric ducted fan motor(s) and/or battery pack/control unit may vary in alternate embodiments. In certain embodiments, an open-air propeller can be used in place of the electric ducted fan motor. This, however, may pose a risk of being cut by the propeller. In some embodiments, the rotation gear(s) can made to be a direct drive from the servo to the electric ducted fan motors via a linkage arm and linkage. In further embodiments, a mechanically adjustable angle may be provided where the motors are fixed and not steerable.

In certain embodiments, the disclosed system may incorporate sensors such as accelerometers, gyroscopes, and GPS units, which may be configured to collect statistical data.

It shall be appreciated that the disclosed subject matter may be applied to various snow equipment systems, including but not limited to snowboards, skis, snow bikes, paralympic skis, etc., but may also be used for systems such as skateboards, bicycles, roller blades, roller skates, scooters, etc.

It shall be appreciated that the device and system described herein may comprise any alternative known materials in the field and be of any size and/or dimensions. It shall be appreciated that the device may be manufactured and assembled using any known techniques in the field.

It shall be understood that the orientation or positional relationship indicated by terms such as "upper", "lower", "front", "rear", "left", "right", "top", "bottom", "inside", "outside" is based on the orientation or positional relationship shown in the accompanying drawings, which is only for convenience and simplification of describing the disclosed subject matter, rather than indicating or implying that the indicated device or element must have a specific orientation or are constructed and operated in a specific orientation, and therefore should not be construed as a limitation of the present invention.

As used herein, the articles "a" and "an" are intended to include one or more items and may be used interchangeably with "one or more." Where only one item is intended, the term "one" or similar language is used. Also, as used herein, the terms "has", "have", "having", "with" or the like are intended to be open-ended terms. Further, the phrase "based on" is intended to mean "based, at least in part, on" unless explicitly stated otherwise.

The constituent elements of the disclosed device and system listed herein are intended to be exemplary only, and it is not intended that this list be used to limit the device of the present application to just these elements. Persons having ordinary skill in the art relevant to the present disclosure may understand there to be equivalent elements that may be substituted within the present disclosure without changing the essential function or operation of the device. Terms such as 'approximate,' 'approximately,' 'about,' etc., as used herein indicate a deviation of within +/−10%. Relationships between the various elements of the disclosed device as described herein are presented as illustrative examples only, and not intended to limit the scope or nature of the relationships between the various elements. Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A system for propelling snow equipment through snow, comprising:
    at least one electric ducted fan motor mounted to the snow equipment, and configured to provide thrust for propelling the snow equipment without direct contact between the electric ducted fan motor and the snow;
    a controller unit mounted to the snow equipment, the controller unit configured to communicate with the electric ducted fan motor and comprising a power source configured to power the electric ducted fan motor;
    wherein the controller unit and electric ducted fan motor are mounted to the snow equipment in a manner which avoids unwanted interference with the operation of the equipment, and
    wherein the snow equipment comprises a snowboard or ski including a top standing surface, and wherein the ducted fan motor is mounted via a mounting element that elevates the ducted fan motor above the top standing surface and below a knee level of a user standing on the top standing surface.

2. The system of claim 1, wherein the power source comprises a battery.

3. The system of claim 1, further comprising a user control system.

4. The system of claim 3, wherein the user control system is configured to allow a user to control speed and/or the amount of thrust provide by the electric ducted fan motor.

5. The system of claim 3, wherein the user control system is configured to allow a user to steer the snow equipment in different directions.

6. The system of claim 3, wherein the user control system comprises a wireless device that can be held by a user of the snow equipment to control speed, direction, and/or turn the electric ducted fan motor off and on.

7. The system of claim 1, wherein the ducted fan motor includes a removable safety cover comprising a mesh screen.

8. The system of claim 1, wherein the ducted fan motor is mounted proximate a trailing and/or leading edge of the snow equipment.

9. The system of claim 1, wherein the power source comprises a battery pack, which includes a battery, and a battery heating element.

10. The system of claim 9, wherein the power source further comprise at least one battery insulation component.

11. The system of claim 1, further comprising a safety shutoff cord including a first end configured to connect to the controller unit, and to be pulled out of the controller unit for shutting off power to the electric ducted fan motor.

12. The system of claim 11, wherein the safety shutoff cord includes a user attachment element on a second end opposite the first end.

13. The system of claim 12, wherein the user attachment element comprises a cuff or loop configured to attach to the user's hand, wrist, leg, clothing, and/or to an accessory worn by the user.

14. The system of claim 1, further comprising wiring for electrical communication between the controller unit and electric ducted fan motor.

15. The system of claim 1, wherein the snow equipment is a snowboard and the controller unit is mounted between a pair of bindings of the snowboard.

16. The system of claim 1, wherein the mounting element elevates the ducted fan motor about 1 cm to about 20 cm above the top standing surface.

* * * * *